US012761112B2

(12) United States Patent
Huang et al.

(10) Patent No.: US 12,761,112 B2
(45) Date of Patent: Oct. 13, 2026

(54) OPTICAL PHASE ANALYZING SYSTEM AND OPTICAL PHASE ANALYZING METHOD

(71) Applicant: INDUSTRIAL TECHNOLOGY RESEARCH INSTITUTE, Hsinchu (TW)

(72) Inventors: Chang Huang, New Taipei City (TW); Ming-An Chen, Taipei City (TW); Guan-Yu Zhu, Taoyuan City (TW); Hsing-Wei Huang, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 102 days.

(21) Appl. No.: 18/989,590

(22) Filed: Dec. 20, 2024

(65) Prior Publication Data

US 2026/0177453 A1 Jun. 25, 2026

(51) Int. Cl.
*G01M 11/02* (2006.01)

(52) U.S. Cl.
CPC ................................ *G01M 11/0271* (2013.01)

(58) Field of Classification Search
CPC .................................................. G01M 11/0271
(Continued)

(56) References Cited

U.S. PATENT DOCUMENTS 6,252,668 B1 * 6/2001 Hill .................... G01B 9/02002 356/485
11,162,976 B2 11/2021 Janunts
(Continued)

FOREIGN PATENT DOCUMENTS

CN 111722392 A 9/2020
CN 114354141 * 4/2022 ............ G01M 11/02
(Continued)

OTHER PUBLICATIONS

Khadir et al., "Metasurface Optical Characterization Using Quadriwave Lateral Shearing Interferometry", ACS Photonics, vol. 8, 2021, pp. 603-613.
Paniagua-Domínguez et al., "A Metalens with a Near-Unity Numerical Aperture", Nano Letters, vol. 18, pp. 2124-2132.
(Continued)

*Primary Examiner* — Isiaka O Akanbi
(74) *Attorney, Agent, or Firm* — Birch, Stewart, Kolasch & Birch, LLP

(57) ABSTRACT

An optical phase analyzing system and an optical phase analyzing method are provided. The optical phase analyzing system includes a light source assembly, an optical phase measuring device, and a processing device. The optical phase measuring device includes a polarizing beam splitter group, an interfering polarizer group, and a polarizing image pickup device. The polarizing beam splitter group is configured to split polarized light into a reference beam and a measurement beam which have a polarization angle difference of 90 degrees, and the measurement beam passes through a meta lens to undergo measurement, such that a phase analysis beam is formed. The interfering polarizer group is configured to cause the reference beam and the phase analysis beam to interfere and circularly polarize to form a circularly polarized beam. The polarizing image pickup device is configured to obtain a meta lens phase according to an unprocessed image.

20 Claims, 7 Drawing Sheets

(58) Field of Classification Search
USPC .......................... 356/487, 485, 450, 498, 491
See application file for complete search history.

(56) References Cited

U.S. PATENT DOCUMENTS

| | | | | |
|---|---|---|---|---|
| 12,216,051 | B2 * | 2/2025 | Millerd | G01N 21/21 |
| 2004/0070767 | A1 * | 4/2004 | Tobiason | G01B 9/02081 356/495 |
| 2004/0080754 | A1 * | 4/2004 | Tobiason | G01B 9/02081 356/495 |
| 2016/0135680 | A1 | 5/2016 | Anderson et al. | |
| 2017/0082263 | A1 * | 3/2017 | Byrnes | B82Y 20/00 |
| 2019/0196068 | A1 | 6/2019 | Tsai et al. | |
| 2021/0132272 | A1 | 5/2021 | Zhu et al. | |
| 2021/0356754 | A1 | 11/2021 | Li et al. | |
| 2022/0307815 | A1 | 9/2022 | Shaked et al. | |
| 2023/0152206 | A1 | 5/2023 | Yasuhiko et al. | |
| 2023/0168482 | A1 | 6/2023 | Liang et al. | |
| 2023/0384609 | A1 | 11/2023 | Zhao et al. | |
| 2024/0045194 | A1 | 2/2024 | Valentine et al. | |
| 2025/0110346 | A1 * | 4/2025 | Soma | G02B 5/30 |
| 2025/0224327 | A1 * | 7/2025 | James | G01B 11/0641 |
| 2025/0224542 | A1 * | 7/2025 | Ni | G02B 3/08 |

FOREIGN PATENT DOCUMENTS

| | | | |
|---|---|---|---|
| CN | 114354141 | B | 5/2024 |
| TW | 201929248 | A | 7/2019 |
| TW | 202024723 | A | 7/2020 |
| TW | 202309581 | A | 3/2023 |
| TW | I796888 | B | 3/2023 |
| TW | 202349064 | A | 12/2023 |
| WO | WO 2018/118984 | A1 | 6/2018 |
| WO | WO 2023/173218 | A1 | 9/2023 |
| WO | WO 2023/235186 | A2 | 12/2023 |

OTHER PUBLICATIONS

Zhao et al., "Phase characterisation of metalenses", Light: Science & Applications, vol. 10, No. 52, 2021, 11 pages.

* cited by examiner

OPTICAL PHASE ANALYZING SYSTEM AND OPTICAL PHASE ANALYZING METHOD

TECHNICAL FIELD

The technical field relates to an optical phase analyzing system and method.

BACKGROUND

A meta lens, a type of lens composed of a nanoscale structure array, can control a phase, an amplitude, and polarization of a light wave. Compared with traditional lenses, the meta lens is thinner, lighter, more concise, and more compact, and can reduce an aberration and improve resolution. The meta lens has bright application prospects in fields of optical imaging apparatuses, microscopes, augmented reality (AR) devices, virtual reality (VR) devices, and the like. Thus, it is a development focus of optical technologies.

The meta lens is manufactured according to set process parameters. However, a phase deviation of the nanoscale structure array of the meta lens still probably occurs. As a result, optical properties of the meta lens cannot conform to design specifications. In order to confirm whether the meta lens phase conforms to the process parameters, it is required to measure phase information of the meta lens. However, an existing measuring apparatus and method for a meta lens are likely to be disturbed by environmental factors (such as air flow, floor vibration or mechanical vibration) during measurement, rendering a measurement result inaccurate.

SUMMARY

An optical phase analyzing system is provided in some embodiments. The optical phase analyzing system is configured for analyzing a meta lens phase of a meta lens. The optical phase analyzing system includes a light source assembly, an optical phase measuring device, and a processing device. The light source assembly is configured to generate polarized light. The optical phase measuring device includes a polarizing beam splitter group, an interfering polarizer group, and a polarizing image pickup device. The polarizing beam splitter group is configured to linearly polarize a light beam and split the light beam into a reference beam and a measurement beam. The reference beam and the measurement beam have a polarization angle difference of 90 degrees. The measurement beam passes through the meta lens to undergo measurement, such that a phase analysis beam is formed. The interfering polarizer group is configured to cause the reference beam and the phase analysis beam to interfere with each other and circularly polarize the reference beam and the phase analysis beam, such that a circularly polarized beam is formed. The polarizing image pickup device is configured to receive the circularly polarized beam to generate an unprocessed image. The unprocessed image includes a first interference image, a second interference image, a third interference image, and a fourth interference image. The first interference image, the second interference image, the third interference image, and the fourth interference image have first interference, second interference, third interference, and fourth interference respectively. The first interference, the second interference, the third interference, and the fourth interference are different. The processing device is configured to obtain the meta lens phase according to the unprocessed image.

In some embodiments, an optical phase measuring device configured to generate an unprocessed image for phase measurement of a meta lens is provided. The optical phase measuring device includes a polarizing beam splitter group, an interfering polarizer group, and a polarizing image pickup device. The polarizing beam splitter group is configured to linearly polarize polarized light and split the polarized light into a reference beam and a measurement beam. The reference beam and the measurement beam have a polarization angle difference of 90 degrees. The measurement beam passes through the meta lens to undergo measurement, such that a phase analysis beam is formed. The interfering polarizer group is configured to cause the reference beam and the phase analysis beam to interfere with each other and circularly polarize the reference beam and the phase analysis beam, such that a circularly polarized beam is formed. The polarizing image pickup device is configured to receive the circularly polarized beam to generate an unprocessed image. The unprocessed image includes a first interference image, a second interference image, a third interference image, and a fourth interference image. The first interference image, the second interference image, the third interference image, and the fourth interference image have first interference, second interference, third interference, and fourth interference respectively. The first interference, the second interference, the third interference, and the fourth interference are different.

In some embodiments, an optical phase analyzing method is provided. The method is configured for phase measurement of a meta lens. The method includes: linearly polarizing polarized light and splitting the polarized light into a reference beam and a measurement beam; causing the measurement beam to pass through the meta lens to undergo measurement, and forming a phase analysis beam; causing the reference beam and the phase analysis beam to interfere with each other, circularly polarizing the reference beam and the phase analysis beam, and forming a circularly polarized beam; receiving the circularly polarized beam, and generating an unprocessed image; and obtaining the meta lens phase according to the unprocessed image.

In some embodiments, the optical phase analyzing system can analyze the meta lens phase of the meta lens to undergo measurement according to the steps of the optical phase analyzing method. The optical phase analyzing system can linearly polarize polarized light and split the polarized light into a reference beam and a measurement beam which have a polarization angle difference of 90 degrees. The measurement beam passes through the meta lens to undergo measurement, and a phase analysis beam is formed. Then, the reference beam and the phase analysis beam are caused to interfere with each other and circularly polarized, such that a circularly polarized beam is formed. Thus, the polarizing image pickup device can capture four images of different phases at a time. In addition, after the processing device receives these images, the meta lens phase can be computed according to a mapping relationship between light field intensities of these images and the phases. Herein, according to the optical phase analyzing system, by performing interference on the phase analysis beam and circularly polarizing the phase analysis beam, the polarizing image pickup device can capture four interference images of different polarization angles at a time. Since an image capturing process is extremely short, an influence of an environmental vibration can be ignored, and the computed meta lens phase is consistent with an actual phase.

Detailed features and advantages of the disclosure will be described in detail below in implementations. According to the above content, any person skilled in the art can understand and practice the technical content of the disclosure. Moreover, any person skilled in the art can easily understand the related objectives and advantages of the disclosure according to content disclosed in the description, the scope of the applied patent, and accompanying drawings.

DETAILED DESCRIPTION

Figure 1:
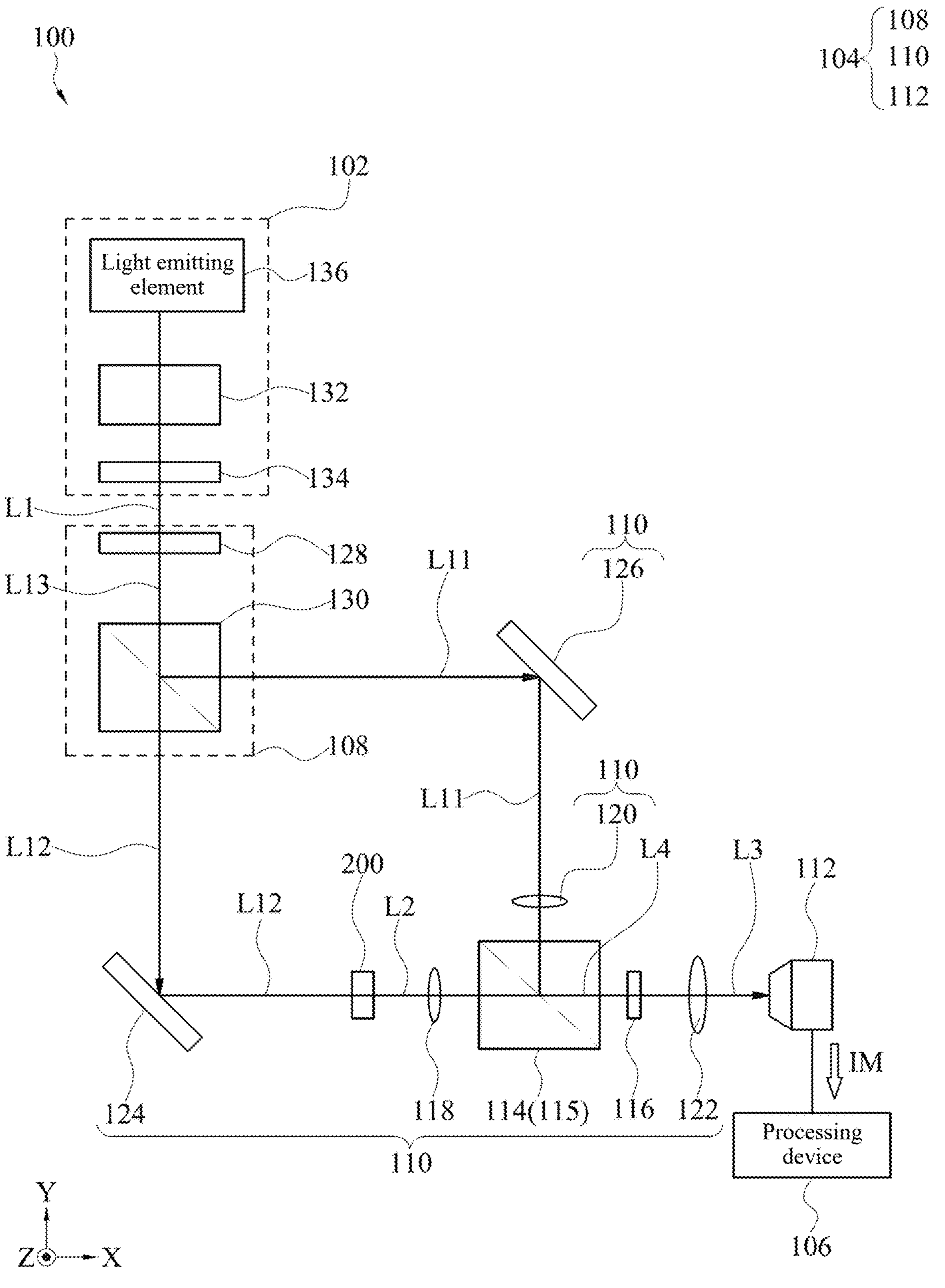
FIG. 1 is a schematic architecture diagram of an optical phase analyzing system according to some embodiments of the disclosure.
Figure 2:
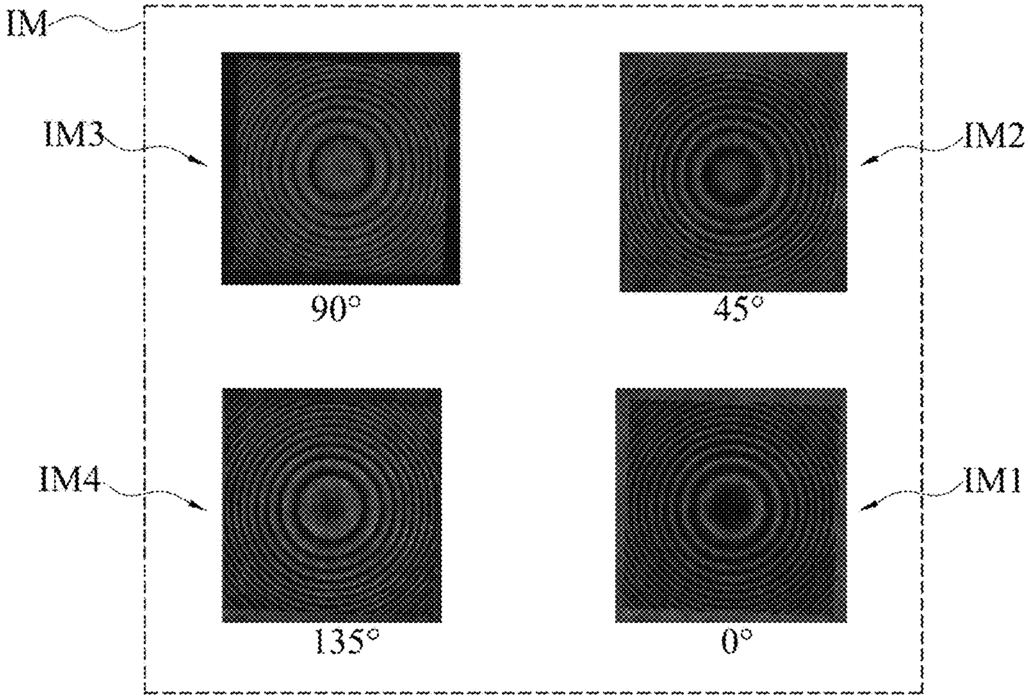
FIG. 2 is a schematic diagram of a first interference image, a second interference image, a third interference image, and a fourth interference image according to some embodiments of the disclosure.

With reference to FIG. 1 and FIG. 2, a schematic architecture diagram of an optical phase analyzing system according to some embodiments of the disclosure is shown in FIG. 1. A schematic diagram of a first interference image, a second interference image, a third interference image, and a fourth interference image according to some embodiments of the disclosure is shown in FIG. 2. In some embodiments, as shown in FIG. 1 and FIG. 2, an optical phase analyzing system 100 is configured to analyze a meta lens phase of a meta lens 200 to undergo measurement. Specifically, the optical phase analyzing system 100 includes a light source assembly 102, an optical phase measuring device 104, and a processing device 106.

The light source assembly 102 is configured to generate polarized light L1. The light source assembly 102 may be a solid-state laser, a gas laser, a semiconductor laser, a fiber laser, and any component that can generate polarized light L1. The light source assembly 102 may generate non-polarized light, and convert the non-polarized light into polarized light L1, so that the polarized light as a light source for measurement of a meta lens (described later). During measurement, when the light source assembly 102 is actuated, polarized light L1 is generated. That is, when the meta lens 200 to undergo measurement is arranged on an optical path of the optical phase analyzing system 100, a user actuates the light source assembly 102. The optical phase measuring device 104 captures an image (IM) to be analyzed and corresponding to the meta lens 200 to undergo measurement, the light source assembly 102 can be selectively turned off.

The polarized light L1 emitted by the light source assembly 102 may be linearly polarized light. A wavelength of the linearly polarized light can be determined according to an optical property (such as a wavelength of a light source to which the meta lens is applied) of the meta lens 200 to undergo measurement. Meta lenses 200 to undergo measurement and having different optical properties can be replaced by light source assemblies 102 which generate corresponding light wavelengths. With horizontally polarized light as an example, the polarized light L1 for measurement of the meta lens 200 to undergo measurement may be infrared laser light (having a light wavelength of 632.8 nm) of He—Ne laser.

The optical phase measuring device 104 includes a polarizing beam splitter group 108, an interfering polarizer group 110, and a polarizing image pickup device 112.

The polarizing beam splitter group 108 is configured to linearly polarize the polarized light L1 and split the polarized light into a reference beam L11 and a measurement beam L12. Linear polarization may mean that a polarization direction of the linearly polarized light is rotated, such that a phase delay occurs on horizontally linearly polarized light (or vertically linearly polarized light), and a linearly polarized beam L13 having different polarization angles is formed (described later). Then, the polarizing beam splitter group 108 splits the linearly polarized beam L13 rotated into the reference beam L11 and the measurement beam L12, and guides the reference beam and the measurement beam to different optical paths. As shown in FIG. 1, polarization angles of the reference beam L11 and the measurement beam L12 may be configured to have a difference of 90 degrees. A polarization direction of the reference beam L11 is a Z-axis direction in FIG. 1. A polarization direction of the measurement beam L12 is an X-axis direction in FIG. 1. In some embodiments, the reference beam L11 and the measurement beam L12 formed by rotating, linearly polarizing, and splitting the polarized light L1 have a same light intensity. In other words, the reference beam L11 and the measurement beam L12 have a same amplitude but different polarization angles. In some embodiments, the polarization angles of the reference beam L11 and the measurement beam L12 may be configured according to different application requirements to have a difference of 45 degrees or 60 degrees. In some embodiments, the polarizing beam splitter group 108 can split the polarized light L1 into a reference beam L11 and a measurement beam L12 which have a same light intensity. The light intensity of the reference beam L11 or the measurement beam L12 is half of a light intensity of the polarized light L1.

In some embodiments, the reference beam L11 is vertically polarized, and the measurement beam L12 is horizontally polarized. Alternatively, the reference beam L11 is horizontally polarized, and the measurement beam L12 is vertically polarized. The reference beam L11 vertically polarized and the measurement beam L12 horizontally polarized will be described below, but the disclosure is not limited thereto.

The measurement beam L12 passes through the meta lens to undergo measurement 200, such that a phase analysis beam L2 is formed. Specifically, after the measurement beam L12 passes through the meta lens to undergo measurement 200, an optical property of the measurement beam L12 will be changed by the meta lens to undergo measurement 200. A phase of the measurement beam L12 is changed, and the phase analysis beam L2 is formed. In some embodiments, a beam range of the measurement beam L12 is not less than an area of a region to undergo measurement of the meta lens 200 to undergo measurement. Thus, the polarizing image pickup device 112 can capture the image (IM) to be analyzed and covering the complete region to undergo measurement of the meta lens 200 to undergo measurement.

The interfering polarizer group 110 is configured to cause the reference beam L11 and the phase analysis beam L2 to interfere with each other and circularly polarize the reference beam and the phase analysis beam, such that a circularly polarized beam L3 is formed. The reference beam L11 is a light kept linearly polarized. The phase analysis beam L2 carries a phase information related to an object to undergo measurement. Interference may mean that the reference beam L11 and the phase analysis beam L2 which are differently linearly polarized overlap. When the two beams L11 and L2 interfere with each other, due to the polarization angle difference between the phase analysis beam L2 and the reference beam L11, an interference beam L4 described later is generated. The interference beam L4 is alternating bright and dark fringes formed by constructive and destructive interference of light. A distance and intensity of the fringes are directly related to the polarization angle difference between the beams. Circular polarization may mean that since electric field vibration directions of the two beams L11 and L2 are rotated with time at a fixed angular velocity, the overlapping linearly polarized beams (the reference beam L11 and the phase analysis beam L2) are converted into the circularly polarized beam L3. That is, the circularly polarized beam L3 may rotate at a fixed angular velocity in a propagation direction (a direction from the interfering polarizer group 110 to the polarizing image pickup device 112), such that optical interference fringes are generated.

The polarizing image pickup device 112 is configured to receive the circularly polarized beam L3 to generate an unprocessed image (IM). The polarizing image pickup device 112 can capture and analyze a polarization state of a light wave such that light shapes having different polarization angles can be captured. Herein, the polarizing image pickup device 112 is arranged in the propagation direction of the circularly polarized beam L3. The polarizing image pickup device 112 can capture the circularly polarized beam L3, and generate the unprocessed image (IM) according to the polarization state of the circularly polarized beam L3.

Figure 3A:
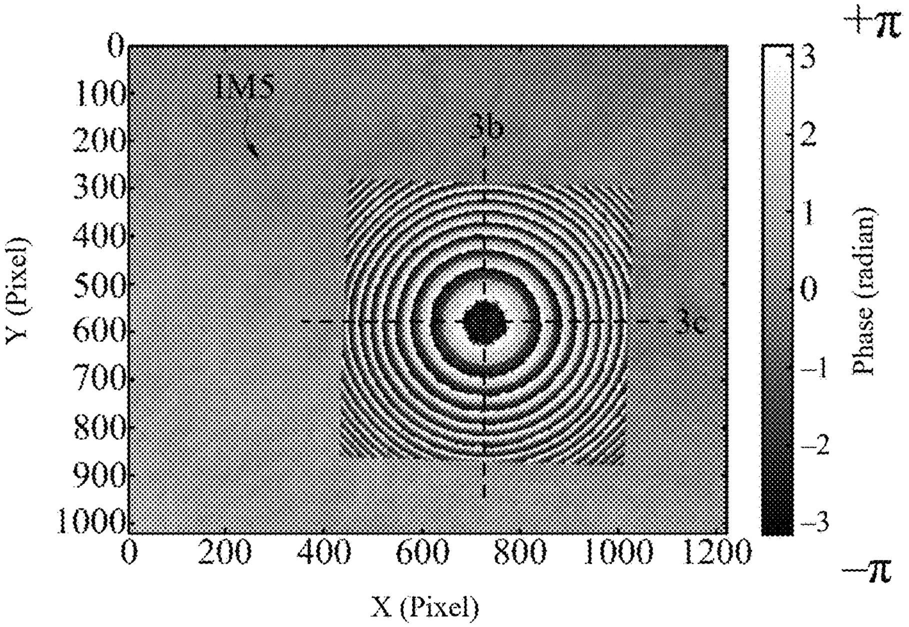
FIG. 3A is an actual phase image obtained according to a meta lens phase according to some embodiments of the disclosure.
Figure 3B:
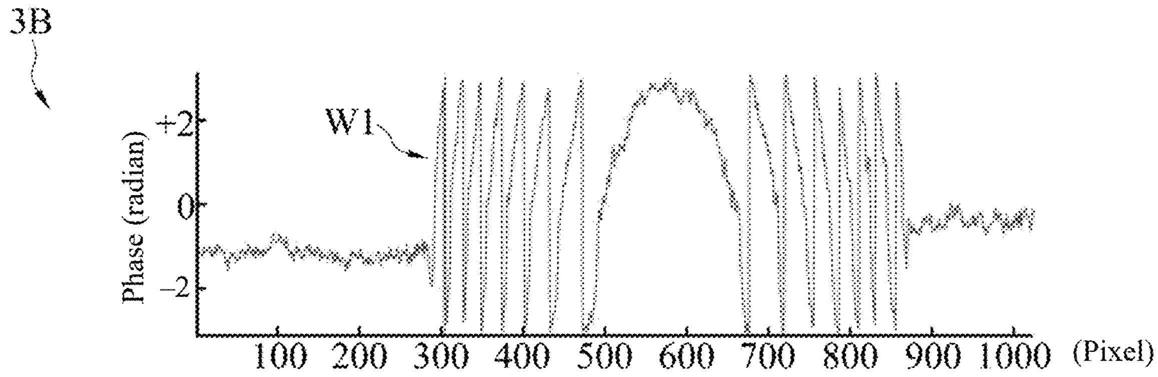
FIG. 3B is a phase image of pixel groups at a position 3b in FIG. 3A.
Figure 3C:
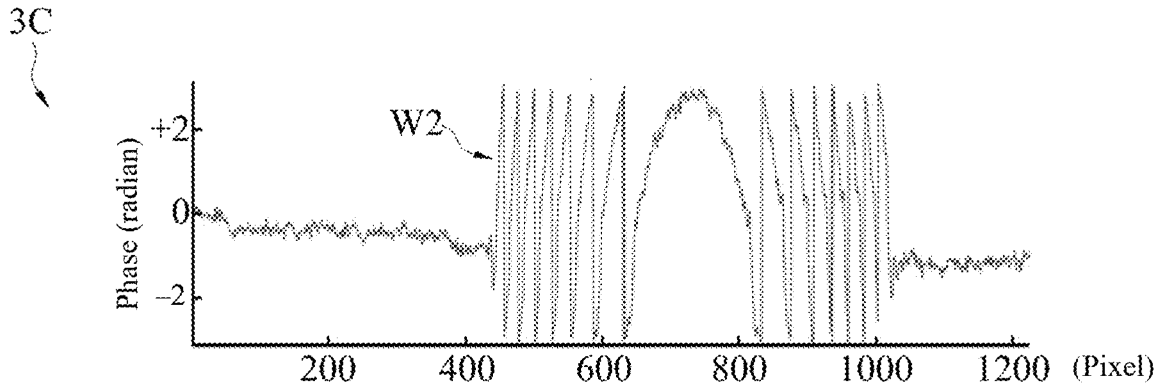
FIG. 3C is a phase image of pixel groups at a position 3c in FIG. 3A.

In some embodiments, the polarizing image pickup device 112 includes a polarizing filter and an optical sensor. The optical sensor includes a plurality of pixels two-dimensionally arranged. The polarizing filter includes a plurality of sub-filters two-dimensionally arranged. Each sub-filter corresponds to a pixel of the optical sensor. Four adjacent pixels of the optical sensor and corresponding four adjacent sub-filters form a group. As shown in FIG. 3E, these four adjacent pixels may be referred to as a pixel group (P1, P2, P3, and P4). The sub-filters in a same group allow differently polarized light to pass through respectively. These polarizing filters may be but are not limited to sub-filters having polarization angles of the first interference, the second interference, the third interference, and the fourth interference, such as sub-filters having polarization angles of 0 degree, 45 degrees, 90 degrees, and 135 degrees.

In some embodiments, an ordering relationship of polarizing filters of pixels in adjacent pixel groups (P1, P2, P3, and P4) is shown in FIG. 3E. Polarization angles of a first column of pixels and a third column of pixels are 90 degrees, 45 degrees, 90 degrees, and 45 degrees in sequence. Polarization angles of a second column of pixels and a fourth column of pixels are 135 degrees, 0 degree, 135 degrees, and 0 degree in sequence. Polarization angles of a first row of pixels and a third row of pixels are 90 degrees, 135 degrees, 90 degrees and 135 degrees in sequence. Polarization angles of a second row of pixels and a fourth row of pixels are 45 degrees, 0 degree, 45 degrees and 0 degree in sequence.

In some embodiments, after the circularly polarized beam L3 passes through four adjacent sub-filters, the polarizing image pickup device 112 outputs an image including four pieces of interference information according to intensities of captured pixels and corresponding polarization angles (0 degree, 45 degrees, 90 degrees, and 135 degrees) and pixel positions. That is, the first interference image (IM1), the second interference image (IM2), the third interference image (IM3), and the fourth interference image (IM4) shown in FIG. 2 correspond to the first interference, the second interference, the third interference, and the fourth interference respectively. With the above example, the first interference image (IM1), the second interference image (IM2), the third interference image (IM3), and the fourth interference image (IM4) correspond to an image of a polarization angle of 0 degree, an image of a polarization angle of 45 degrees, an image of a polarization angle of 90 degrees, and an image of a polarization angle of 135 degrees respectively.

As mentioned above, the polarizing image pickup device 112 can capture four interference images (IM1, IM2, IM3, and IM4) of different interference at a time such that environmental low-frequency vibration interference can be countered. According to a device which is required to capture different interference images at different time points, even if components of a phase measuring system are stably arranged or placed on a flat surface as much as possible, the interference images captured at different time points cannot avoid interference of an environmental low-frequency vibration due to different time. Thus, errors exist between the different interference images captured at the different time points. Moreover, a meta lens phase further computed is not accurate enough.

The processing device 106 is configured to obtain the meta lens phase according to the unprocessed image (IM). The processing device 106 may be, for example, a processing chip (such as a graphics processing unit (GPU) or a central processing unit (CPU)) having image analysis and computation capabilities, or an electronic device (such as a computer) capable of running the above processing chip. The processing device 106 may be in communication connection to the polarizing image pickup device 112 such that the polarizing image pickup device 112 can transmit the unprocessed image (IM) to the processing device 106. Herein, the processing device 106 can analyze, according to an optical property relationship of interference images (IM1, IM2, IM3, and IM4) of four different polarization angles, a phase change of the measurement beam L12 passing through the meta lens to undergo measurement 200, such that the meta lens phase of the meta lens to undergo measurement 200 can be obtained. Furthermore, by comparing the meta lens phase with a phase of design parameters, whether the meta lens to undergo measurement 200 satisfies design requirements can be determined.

In some embodiments, a polarization angle of the first interference is less than a polarization angle of the second interference. The polarization angle of the second interference is less than a polarization angle of the third interference. The polarization angle of the third interference is less than a polarization angle of the fourth interference. The first interference is 0 degree. The second interference is 45 degrees. The third interference is 90 degrees. The fourth interference is 135 degrees. Configurations of polarization angles (0 degree, 45 degrees, 90 degrees, and 135 degrees) will be taken as an example for description below.

In some embodiments, after the processing device 106 obtains the meta lens phase by using a phase computation formula, the meta lens phase is compared with design parameters such that whether specifications are satisfied can be determined. FIG. 3A, FIG. 3B, and FIG. 3C are taken as examples for description below. FIG. 3A is an actual phase image obtained according to a meta lens phase according to some embodiments of the disclosure. FIG. 3B is a phase image of pixel groups at a position 3b in FIG. 3A. FIG. 3C is a phase image of pixel groups at a position 3c in FIG. 3A. As shown in FIG. 3A, after the processing device 106 computes the meta lens phase, an actual phase image (IM5) can be generated according to the computed result. The actual phase image (IM5) shows phases (ranging from +π to −π) of the meta lens to undergo measurement 200 at different pixel positions. If the actual phase image (IM5) is analyzed at a position 3b, phases at pixel positions 0 to 1000 of the phase analysis beam L2 at the position 3b can be captured from the circularly polarized beam L3. Herein, a phase corresponding to a phase angle at pixel positions about 300 to 900 of the phase analysis beam L2 is a measured meta lens phase (remarked as an actual vertical phase waveform W1 in FIG. 3B). If the actual phase image (IM5) is analyzed at a position 3c, phases at pixel positions 0 to 1200 of the phase analysis beam L2 at the position 3c can be captured from the circularly polarized beam L3. A phase angle at pixel positions about 400 to 1000 of the phase analysis beam L2 is a measure meta lens phase of the meta lens 200 to undergo measurement (remarked as an actual horizontal phase waveform W2 in FIG. 3C).

A phase range of the actual vertical phase waveform W1 and the actual horizontal phase waveform W2 in FIG. 3B or FIG. 3C corresponds to an area of a region to undergo measurement of the meta lens 200 to undergo measurement irradiated by the reference beam L11 and the phase analysis beam L2. In other words, the area of the region to undergo measurement may be 600 (a Y-axis length of 900-300)*600 (an X-axis length of 1000-400). Herein, the meta lens 200 to undergo measurement can be considered for determining a beam diameter of the phase analysis beam L2 (described later).

Figure 3D:
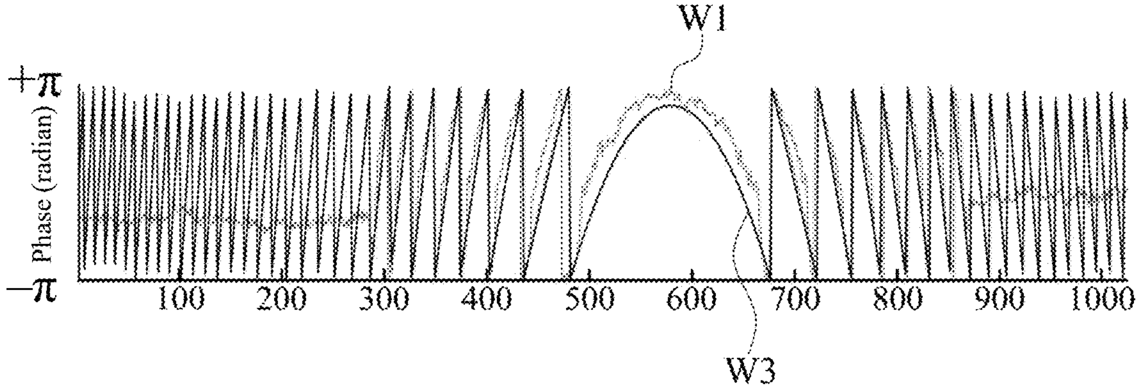
FIG. 3D is a diagram of a comparison between the phase image of the pixel groups of a meta lens to undergo measurement at the position 3b in FIG. 3A and a design phase image.
Figure 3E:
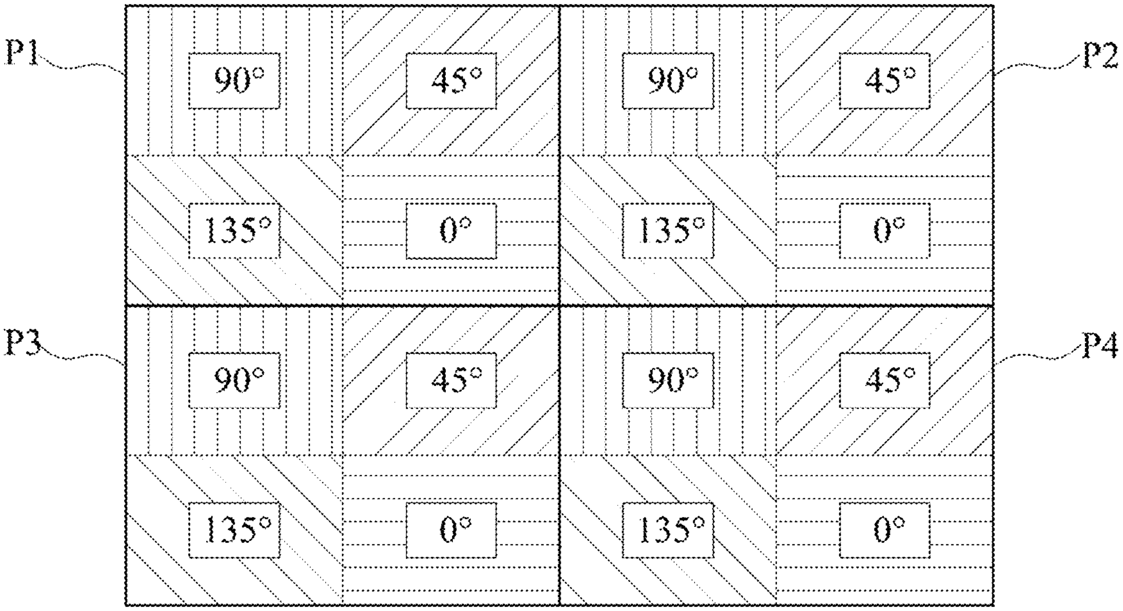
FIG. 3E is a schematic diagram of four pixel groups captured by an optical sensor of a polarizing image pickup device according to some embodiments of the disclosure.

As shown in FIG. 3D, a diagram of a comparison between the phase image of the pixel groups of a meta lens to undergo measurement at the position 3b in FIG. 3A and a design phase image is shown in FIG. 3D. As shown in FIG. 3D, the actual vertical phase waveform W1 shown in FIG. 3B is compared with a preset phase waveform W3 generated according to a design such that a phase difference between the two waveforms can be determined. In some embodiments, the actual vertical phase waveform W1 and the preset phase waveform W3 may overlap according to pixel positions, such that a phase angle difference between the actual vertical phase waveform and the preset phase waveform can be obtained through a comparison at each pixel position. If phase angles are the same at a single point or a range of pixel positions, it indicates that the region to undergo measurement satisfies product specifications. On the contrary, if phase angles deviate in a pixel range and a phase deviation exceeds a preset threshold, it indicates that the region to undergo measurement does not satisfy product specifications. A default threshold can be set according to product accuracy requirements. For example, in a range of pixel positions about 300 to 900, the phase of the actual vertical phase waveform W1 at each pixel position is close to the phase of the preset phase waveform W3. Herein, according to the comparison result, it can be determined that the region to undergo measurement conforms to process parameters.

In some embodiments, the processing device 106 is configured to obtain a meta lens phase according to a phase computation formula. The phase computation formula is as follows:

$$\Gamma = \tan^{-1}2\left(\frac{I_1 - I_3}{I_2 - I_4}\right).$$

Specifically, Γ is the meta lens phase, $I_1$ is a first light field strength of a first interference image (IM1), $I_2$ is a second light field strength of a second interference image (IM2), $I_3$ is a third light field strength of a third interference image (IM3), and $I_4$ is a fourth light field strength of a fourth interference image (IM4).

According to the phase computation formula, the processing device 106 can compute the meta lens phase according to a mapping relationship between the unprocessed image (IM), and the first light field strength of the first interference (such as a polarization angle of 0 degree), the second light field strength of the second interference (such as a polarization angle of 45 degrees), the third light field strength of the third interference (such as a polarization angle of 90 degrees), and the fourth light field strength of the fourth interference (such as a polarization angle of 135 degrees). Herein, after the optical phase measuring device 104 intercepts the circularly polarized beam L3 at a time, and generates a corresponding unprocessed image (IM), the processing device 106 can estimate the meta lens phase by performing computation by using the unprocessed image (IM). Thus, the situation that a computed meta lens phase deviates too much from an actual phase because the unprocessed image (IM) is affected by an environmental vibration can be avoided.

The processing device 106 computes the meta lens phase according to a mapping relationship of the first light field strength, the second light field strength, the third light field strength, and the fourth light field strength. The mapping relationship may mean a comparison relationship between the light field strength of each interference and an average light field strength. Herein, the light field strength of each interference is obtained by using formulas as follows:

$$0 \text{ degrees: } I_1 = I_0(1 + \gamma\sin\Gamma);$$

$$45 \text{ degrees: } I_2 = I_0(1 + \gamma\cos\Gamma);$$

$$90 \text{ degrees: } I_3 = I_0(1 - \gamma\sin\Gamma); \text{ and}$$

$$135 \text{ degrees: } I_4 = I_0(1 - \gamma\cos\Gamma).$$

Specifically, $I_0$ is an average light field strength, $I_1$ is a first light field strength, $I_2$ is a second light field strength, $I_3$ is a third light field strength, $I_4$ is a fourth light field strength, γ is a light field strength contrast coefficient, and Γ is a meta lens phase.

According to the above formulas, the average light field strength is an average of the light field intensities, that is, $I_0 = \frac{1}{4}(I_1+I_2+I_3+I_4)$, and the light field strength contrast coefficient is as follows:

$$Y = \sqrt{\frac{(I_4 - I_2)^2 + (I_1 - I_3)^2}{2I_0}}.$$

Herein, the phase computation formula can be derived according to the above formulas.

In some embodiments, as shown in FIG. 1, the interfering polarizer group 110 includes a polarizing beam splitter (PBS) (or referred to as a beam splitter) 114 and a quarter-wave plate (QWP) 116. The polarizing beam splitter 114 combines the reference beam L11 and the phase analysis beam L2 into an interference beam L4 based on polarization states of the beams. Since the reference beam L11 and the phase analysis beam L2 have a polarization angle difference, the beam obtained by combining the reference beam L11 and the phase analysis beam L2 by the beam splitter 114 forms interference fringes due to the polarization angle difference. Accordingly, the interference beam L4 is generated. The quarter-wave plate 116 is configured to change the polarization state of the interference beam L4. When the interference beam L4 passes through the quarter-wave plate 116, the interference beam is split into two different polarization components. One is provided along a fast axis of the quarter-wave plate 116, and the other one is provided along a slow axis of the quarter-wave plate 116. Since the two polarization components propagate at different speeds in two different directions (a fast-axis direction and a slow-axis directions), the two polarization components have a polarization angle difference. The polarization angle difference refers to a time difference between a peak and a trough of a beam. For example, when a polarization angle difference between two polarization components is 90 degrees, it means that when an electric field of one component reaches a peak, an electric field of the other component is exactly zero. Such a polarization angle difference causes a change in polarization state, and thus the interference beam L4 is converted into a circularly polarized beam L3. That is, when the linearly polarized beam L13 passes through the quarter-wave plate 116, the quarter-wave plate 116 may convert the linearly polarized beam L13 into the circularly polarized beam L3. In some embodiments, when the circularly polarized beam L3 passes through the quarter-wave plate 116, the quarter-wave plate 116 may convert the circularly polarized beam L3 into the linearly polarized beam L13. Herein, the beam splitter 114 may be located between the meta lens to undergo measurement 200 and the quarter-wave plate 116. The quarter-wave plate 116 may be located between the beam splitter 114 and the polarizing image pickup device 112. It should be noted that the interference beam L4 formed by the beam splitter 114 is still linearly polarized. The interference beam L4 is circularly polarized by the quarter-wave plate 116, such that the circularly polarized beam L3 is formed.

In some embodiments, as shown in FIG. 1, the interfering polarizer group 110 includes an interfering mirror 115 and a quarter-wave plate 116. The quarter-wave plate 116 can be obtained with reference to the above content and will not be repeated. The interfering mirror 115 may directly combine the two beams regardless of polarization states of the two beams L11 and L2. The two beams L11 and L2 are recombined together after passing through reflection and transmission paths of the interfering mirror 115, and interfere with each other during recombination. That is, phases of the two beams L11 and L2 overlap, such that interference fringes are formed, and an interference beam L4 is formed. The quarter-wave plate 116 is configured to circularly polarize the interference beam L4, such that a circularly polarized beam L3 is formed. Herein, the interfering mirror 115 may be located between the meta lens 200 to undergo measurement and the quarter-wave plate 116. The quarter-wave plate 116 may be located between the interfering mirror 115 and the polarizing image pickup device 112. It should be noted that the interference beam L4 formed by the interfering mirror 115 is still linearly polarized. The interference beam L4 is circularly polarized by the quarter-wave plate 116, such that the circularly polarized beam L3 is formed.

In some embodiments, as shown in FIG. 1, the interfering polarizer group 110 further includes a first objective lens 118, a second objective lens 120, and a tube lens 122. The first objective lens 118 is located between the meta lens to undergo measurement 200 and the polarizing beam splitter 114. The second objective lens 120 is located between the polarizing beam splitter 114 and the polarizing beam splitter group 108. The tube lens 122 is located between the quarter-wave plate 116 and the polarizing image pickup device 112. A magnification of the first objective lens 118 and the tube lens 122 is the same as a magnification of the second objective lens 120 and the tube lens 122. Herein, the reference beam L11 and the phase analysis beam L2 can be ensured to have a same beam size such that sufficient interference can be ensured. Moreover, the polarizing image pickup device 112 can capture a clear circularly polarized beam L3. Further, the circularly polarized beam L3 is magnified such that the polarizing image pickup device 112 can capture pixels of a local region. In some embodiments, the magnification of the first objective lens 118 and the tube lens 122 is 20 times. The magnification of the second objective lens 120 and the tube lens 122 is 20 times. However, a user can select, according to the size of the meta lens to undergo measurement 200, a magnification capable of capturing a clear image. The magnification is not limited to 20 times.

In some embodiments, as shown in FIG. 1, the interfering polarizer group 110 further includes a first reflecting mirror 124 and a second reflecting mirror 126. The first reflecting mirror 124 is configured to guide the measurement beam L12 to the meta lens to undergo measurement 200. The second reflecting mirror 126 is configured to guide the reference beam L11 to the polarizing beam splitter 114. When the reference beam L11 and the measurement beam L12 are obtained through splitting by the polarizing beam splitter group 108, by the first reflecting mirror 124 or the second reflecting mirror 126, the reference beam L11 and the measurement beam L12 can accurately enter the polarizing beam splitter 114 or the meta lens to undergo measurement 200. According to relative positions of the polarizing beam splitter group 108, the polarizing beam splitter 114, and the meta lens to undergo measurement 200, light can be guided to a preset position by the first reflecting mirror 124 and the second reflecting mirror 126. Herein, the first reflecting mirror 124 may be located between the polarizing beam splitter group 108 and the meta lens to undergo measurement 200. The second reflecting mirror 126 may be located between the polarizing beam splitter group 108 and the polarizing beam splitter 114.

In some embodiments, as shown in FIG. 1, the polarizing beam splitter group 108 includes a half-wave plate 128 and a polarizing beam splitter (PBS) (or referred to as a beam splitter) 130. The half-wave plate 128 may be located between the light source assembly 102 and the polarizing beam splitter 130. The polarizing beam splitter 130 may be located between the half-wave plate 128 and the interfering mirror 115 such that beam splitting and polarization adjustment can be cooperatively achieved. In other words, the polarizing beam splitter group 108 is formed by combining a plurality of components, such as the half-wave plate 128 and the polarizing beam splitter 130 such that polarized light can be split, and a polarization angle can be adjusted. In the polarizing beam splitter group 108, the half-wave plate 128 rotates the polarization angle of the polarized light by 2 times an incident angle, and linearly polarizes the polarized light L1 (rotates a direction of linearly polarized light), such that the linearly polarized beam L13 is formed. For example, the half-wave plate 128 linearly polarizes the polarized light L1, which may mean that the horizontally polarized light L1 is rotated by a polarization angle of 45 degrees. The beam splitter 130 may be configured to reflect a part of the linearly polarized beam L13, such that the reference beam L11 is formed, and transmit another part of the linearly polarized beam L13, such that the measurement beam L12 is formed. An angle between the beam splitter 130 and an optical path direction of the polarized light L1 is 45 degrees. For example, since the angle between the beam splitter 130 and the optical path direction of the polarized light L1 is 45 degrees, the polarized light L1 rotated by a phase angle of 45 degrees is effectively split into two differently polarized light, that is, the reference beam L11 and the measurement beam L12. The reference beam L11 and the measurement beam L12 have a same light intensity but different polarization angles (such as a polarization angle difference of 90 degrees). The reference beam L11 and the measurement beam L12 may subsequently interfere with each other at the interfering polarizer group 110. In addition, the optical path can be divided into two paths according to the polarization direction. One path is a vertical polarization path which passes through the meta lens to undergo measurement 200 and then enters the polarizing beam splitter 114. The other path is a horizontal polarization path which directly enters the polarizing beam splitter 114.

In some embodiments, the polarizing beam splitter 130 can split the polarized light L1 into a reference beam L11 and a measurement beam L12 which have a same light intensity. The light intensity of the reference beam L11 or the measurement beam L12 is half of a light intensity of the polarized light L1.

In some embodiments, as shown in FIG. 1, the light source assembly 102 includes a beam expander 132 and an aperture 134. The beam expander 132 is located between the light source assembly 102 and the half-wave plate 128, and configured to increase a beam diameter. The aperture 134 is located between the beam expander 132 and the half-wave plate 128, and configured to adjust a beam size of the polarized light L1 to a size suitable for the meta lens to undergo measurement 200. The beam expander 132 can determine an expanding range of the polarized light L1 according to a size of a region to undergo measurement of the meta lens to undergo measurement 200. Thus, a range of the meta lens to undergo measurement 200 irradiated by the measurement beam L12 can be not less than an area of the region to undergo measurement. Thus, the polarizing image pickup device 112 can capture all pixels on the region to undergo measurement.

Figure 4:
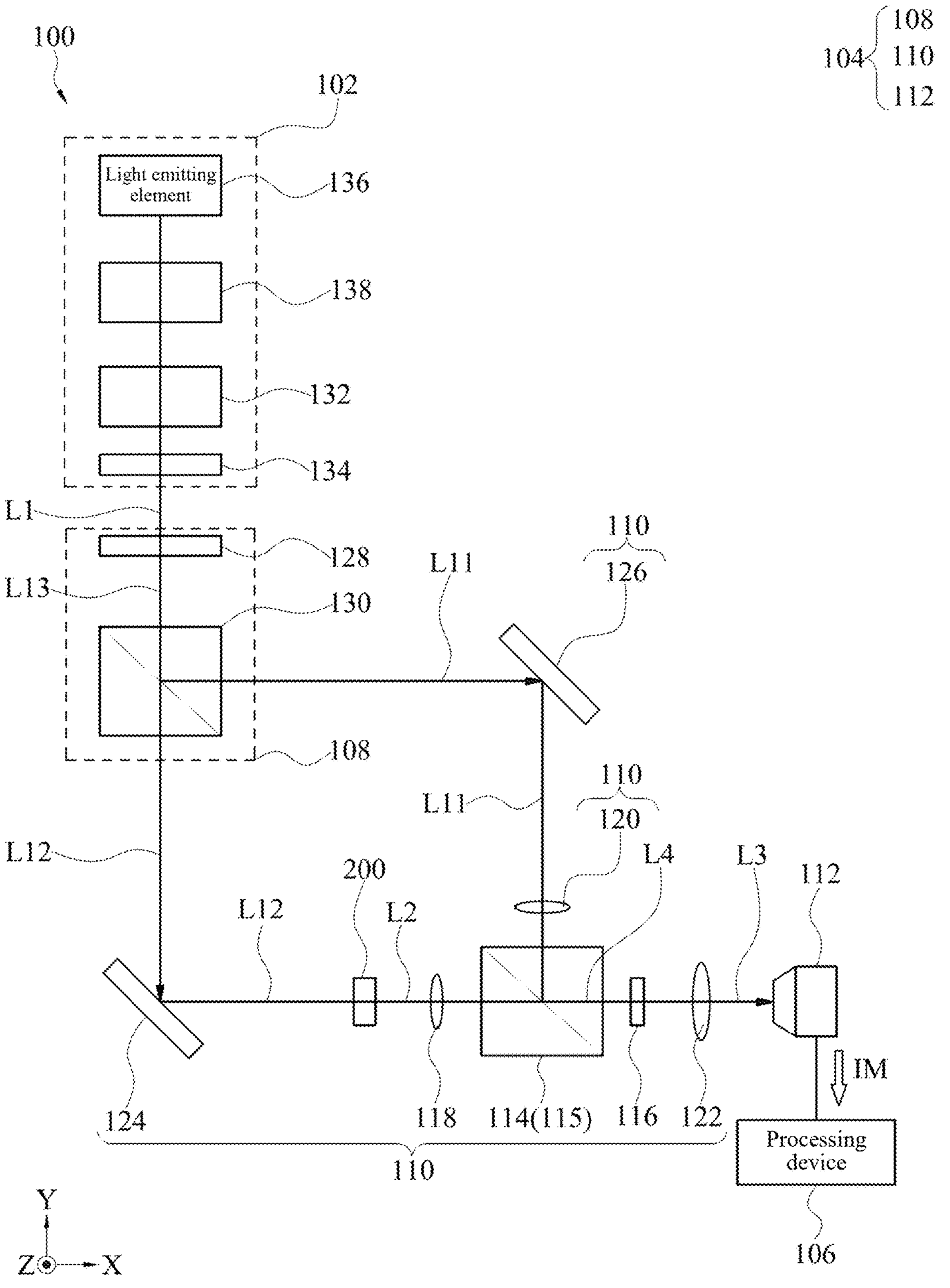
FIG. 4 is a schematic architecture diagram of an optical phase analyzing system according to some embodiments of the disclosure, illustrating an implementation of a light source assembly.

With reference to FIG. 4, a schematic architecture diagram of an optical phase analyzing system according to some embodiments of the disclosure is shown in FIG. 4, illustrating an implementation of a light source assembly. In some embodiments, as shown in FIG. 4, the light source assembly 102 further includes a light emitting element 136 and an optical filter 138. The light emitting element 136 is configured to generate polarized light L1. The optical filter 138 is configured to adjust a wavelength of the polarized light L1, such that the polarized light L1 is suitable for measurement of the meta lens to undergo measurement 200. Herein, the optical filter 138 may be located between the light emitting element 136 and the beam expander 132. In some embodiments, the polarized light L1 generated by the light emitting element 136 may be a white laser beam. Herein, the optical filter 138 may be replaced, according to an optical property of the meta lens to undergo measurement 200, with a wavelength suitable for measurement of the meta lens to undergo measurement 200 such that accuracy of measurement of the meta lens phase can be increased.

In some embodiments, in an embodiment of FIG. 1, the light source assembly 102 may generate polarized light L1 by the light emitting element 136, and emit the polarized light L1 into the beam expander 132.

Figure 5:
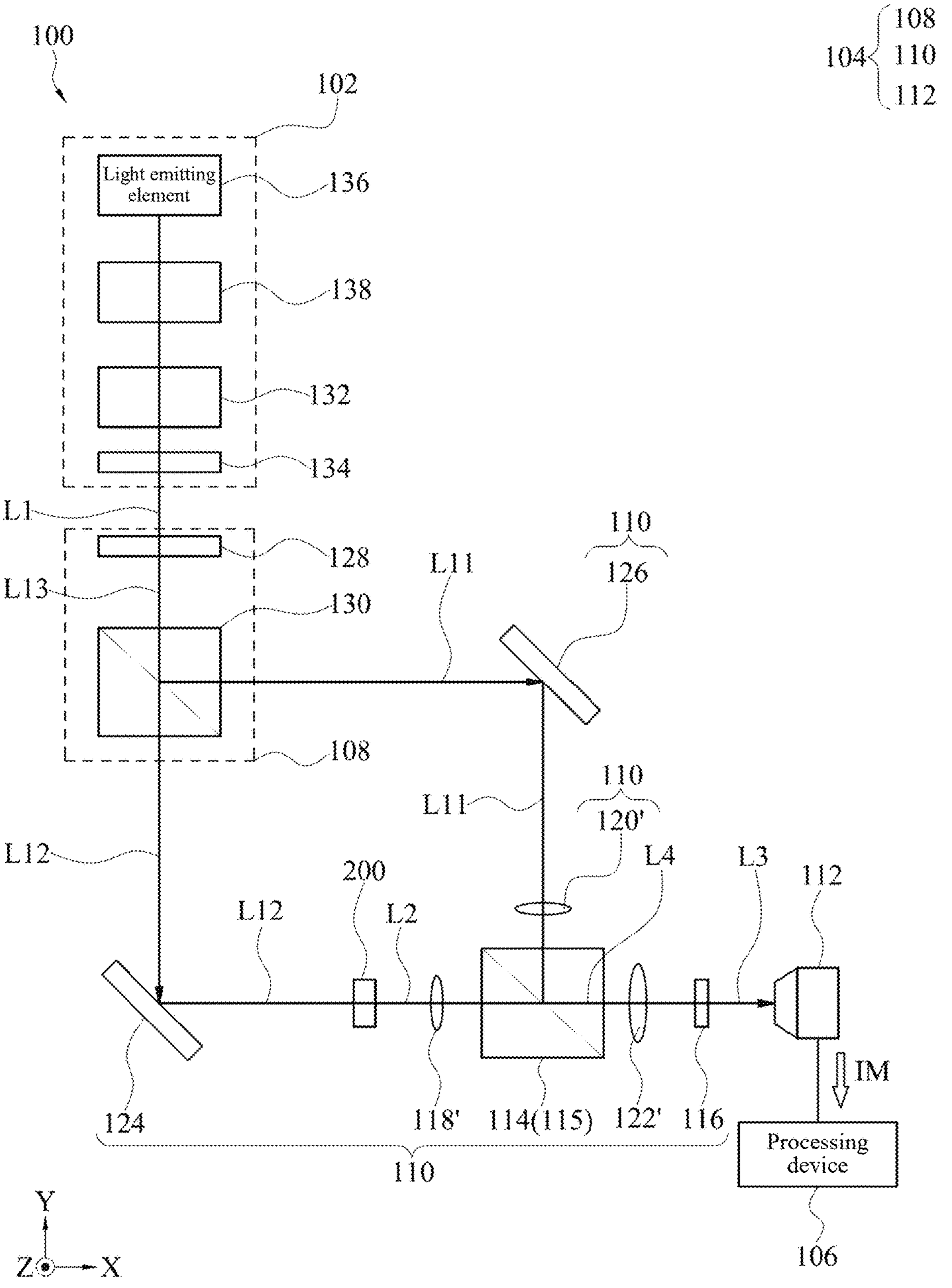
FIG. 5 is a schematic architecture diagram of an optical phase analyzing system according to some embodiments of the disclosure, illustrating an implementation of an interfering polarizer group.

With reference to FIG. 5, a schematic architecture diagram of an optical phase analyzing system according to some embodiments of the disclosure is shown in FIG. 5, illustrating an implementation of an interfering polarizer group. In some embodiments, as shown in FIG. 5, the interfering polarizer group 110 further includes a first objective lens 118', a second objective lens 120', and a tube lens 122'. The first objective lens 118' is located between the meta lens to undergo measurement 200 and the polarizing beam splitter 114. The second objective lens 120' is located between the polarizing beam splitter 114 and the polarizing beam splitter group 108. The tube lens 122' is located between the polarizing beam splitter 114 and the quarter-wave plate 116. A magnification of the first objective lens 118' and the tube lens 122' is the same as a magnification of the second objective lens 120' and the tube lens 122'. The difference between embodiments shown in FIG. 1 and FIG. 5 is that the interference beam L4 in FIG. 5 is first magnified according to the magnification. Then, the magnified interference beam L4 is circularly polarized by the quarter-wave plate 116. In contrast, the interference beam L4 in FIG. 1 is first circularly polarized by the quarter-wave plate 116, and then magnified according to the magnification. In the two implementations, the circularly polarized beam L3 can be generated. The meta lens phase can be computed by the processing device 106. It should be noted that since the interference beam L4 first enters the tube lens 122' to be magnified, a focal length between the quarter-wave plate 116 and the tube lens 122' can be adjusted before measurement such that focusing can be performed to the polarizing image pickup device 112. Herein, it is ensured that the polarizing image pickup device 112 can capture a clear image. The light source assembly 102, the optical phase measuring device 104, and the processing device 106 in the embodiment of FIG. 5 are the same as those in the embodiment of FIG. 1, with reference to the descriptions of the embodiment of FIG. 1.

Figure 6:
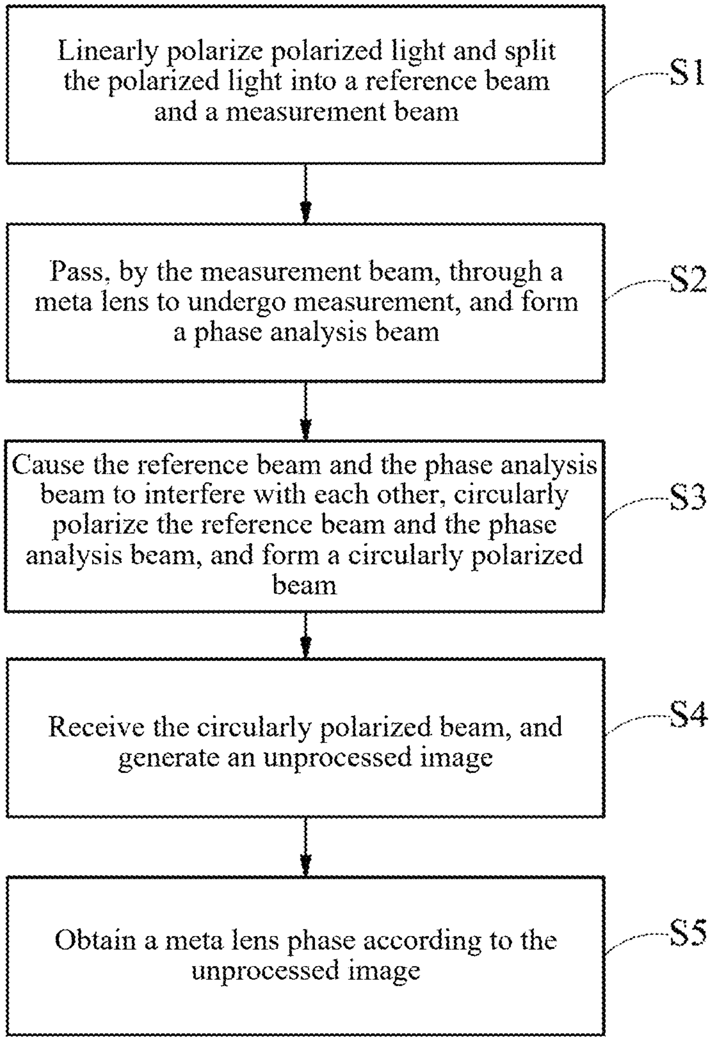
FIG. 6 is a flow diagram of an optical phase analyzing method according to some embodiments of the disclosure.

With reference to FIG. 6, a flow diagram of an optical phase analyzing method according to some embodiments of the disclosure is shown in FIG. 6. As shown in FIG. 6, an optical phase analyzing method includes steps as follows: polarized light L1 is linearly polarized, and split into a reference beam L11 and a measurement beam L12 (S1). The measurement beam L12 passes through the meta lens to undergo measurement 200, and a phase analysis beam L2 is formed (S2). The reference beam L11 and the phase analysis beam L2 are caused to interfere with each other and circularly polarized, and a circularly polarized beam L3 is formed (S3). The circularly polarized beam L3 is received, and an unprocessed image (IM) is generated (S4). The meta lens phase is obtained according to the unprocessed image (IM) (S5).

Steps (S1 to S5) shown in FIG. 6 may be executed by the optical phase analyzing system 100 shown in FIG. 1, FIG. 4 or FIG. 5. Details of measurement and analysis processes can be obtained with reference to the descriptions of the optical phase analyzing system 100 shown in FIG. 1, FIG. 4 or FIG. 5.

In summary, in some embodiments, the optical phase analyzing system 100 can analyze the meta lens phase of the meta lens to undergo measurement 200 according to the steps of the optical phase analyzing method. The optical phase analyzing system 100 can linearly polarize the polarized light L1 and split the polarized light into a reference beam L11 and a measurement beam L12 which have different polarization angles (such as a polarization angle difference of 90 degrees) by the polarizing beam splitter group 108. After the measurement beam L12 passes through the meta lens to undergo measurement 200, and the phase analysis beam L2 is formed, the reference beam L11 and the phase analysis beam L2 are caused to interfere with each other and circularly polarized by the interfering polarizer group 110, such that the circularly polarized beam L3 is formed. Thus, the polarizing image pickup device 112 can capture four images (IM1, IM2, IM3, and IM4) of different interference at a time. In addition, after receiving the images (IM1, IM2, IM3, and IM4), the processing device 106 can compute the meta lens phase according to a mapping relationship between the light field intensities of the images (IM1, IM2, IM3, and IM4) and the interference.

The above embodiments are merely for describing the technical ideas and features of the disclosure. The purpose of the embodiments is to enable a person familiar with the art to understand and implement the content of the disclosure. The patent scope of the disclosure certainly cannot be limited by the embodiments. That is, all equivalent changes or modifications made in accordance with the spirit disclosed in the disclosure should fall within the patent application scope of the disclosure.

What is claimed is:

1. An optical phase analyzing system, configured to analyze a meta lens phase of a meta lens to undergo measurement, comprising:
- a light source assembly configured to generate polarized light;
- an optical phase measuring device comprising:
  - a polarizing beam splitter group configured to linearly polarizing the polarized light and split the polarized light into a reference beam and a measurement beam, wherein the reference beam and the measurement beam have a polarization angle difference of 90 degrees, and the measurement beam passes through the meta lens to undergo measurement, such that a phase analysis beam is formed;
  - an interfering polarizer group configured to cause the reference beam and the phase analysis beam to interfere with each other and circularly polarizing the reference beam and the phase analysis beam, such that a circularly polarized beam is formed; and
  - a polarizing image pickup device configured to receive the circularly polarized beam to generate an unprocessed image, wherein the unprocessed image comprises a first interference image, a second interference image, a third interference image, and a fourth interference image, the first interference image, the second interference image, the third interference image, and the fourth interference image have first interference, second interference, third interference, and fourth interference respectively, and the first interference, the second interference, the third interference, and the fourth interference are different; and
- a processing device configured to obtain the meta lens phase according to the unprocessed image.

2. The optical phase analyzing system according to claim 1, wherein a polarization angle of the first interference is less than a polarization angle of the second interference, the polarization angle of the second interference is less than a polarization angle of the third interference, and the polarization angle of the third interference is less than a polarization angle of the fourth interference.

3. The optical phase analyzing system according to claim 2, wherein the polarization angle of the first interference is 0 degree, the polarization angle of the second interference is 45 degrees, the polarization angle of the third interference is 90 degrees, and the polarization angle of the fourth interference is 135 degrees.

4. The optical phase analyzing system according to claim 3, wherein the processing device is configured to obtain the meta lens phase according to a phase computation formula, and the phase computation formula is as follows:

$$\Gamma = \tan^{-1} 2\left(\frac{I_1 - I_3}{I_2 - I_4}\right),$$

wherein
- $\Gamma$ is the meta lens phase;
- $I_1$ is a first light field strength of the first interference image;
- $I_2$ is a second light field strength of the second interference image;
- $I_3$ is a third light field strength of the third interference image; and
- $I_4$ is a fourth light field strength of the fourth interference image.

5. The optical phase analyzing system according to claim 1, wherein the interfering polarizer group comprises:
- a polarizing beam splitter configured to cause the reference beam and the phase analysis beam to interfere with each other, such that an interference beam is formed; and
- a quarter-wave plate configured to circularly polarize the interference beam, such that the circularly polarized beam is formed.

6. The optical phase analyzing system according to claim 5, wherein the interfering polarizer group further comprises:
- a first objective lens located between the meta lens to undergo measurement and the polarizing beam splitter;
- a second objective lens located between the polarizing beam splitter and the polarizing beam splitter group; and
- a tube lens located between the quarter-wave plate and the polarizing image pickup device, wherein a magnification of the first objective lens and the tube lens is the same as a magnification of the second objective lens and the tube lens.

7. The optical phase analyzing system according to claim 5, wherein the interfering polarizer group further comprises:
- a first objective lens located between the meta lens to undergo measurement and the polarizing beam splitter;

a second objective lens located between the polarizing beam splitter and the polarizing beam splitter group; and a tube lens located between the polarizing beam splitter and the quarter-wave plate, wherein a magnification of the first objective lens and the tube lens is the same as a magnification of the second objective lens and the tube lens.

8. The optical phase analyzing system according to claim 5, wherein the interfering polarizer group further comprises:

a first reflecting mirror configured to guide the measurement beam to the meta lens to undergo measurement; and a second reflecting mirror configured to guide the reference beam to the polarizing beam splitter.

9. The optical phase analyzing system according to claim 1, wherein the polarizing beam splitter group comprises:

a half-wave plate configured to linearly polarize the polarized light, such that a linearly polarized beam is formed; and a beam splitter configured to split the linearly polarized beam, such that the reference beam and the measurement beam are formed.

10. The optical phase analyzing system according to claim 9, wherein the light source assembly comprises:

a beam expander located between the light source assembly and the half-wave plate, and configured to increase a beam diameter of the linearly polarized beam; and an aperture located between the beam expander and the half-wave plate, and configured to adjust a beam size of the linearly polarized beam to a size suitable for the meta lens to undergo measurement.

11. The optical phase analyzing system according to claim 1, wherein the light source assembly further comprises:

a light emitting element configured to generate the polarized light; and an optical filter configured to adjust a wavelength of the polarized light, such that the polarized light is suitable for measurement of the meta lens to undergo measurement.

12. An optical phase measuring device, configured to generate an unprocessed image for phase measurement of a meta lens, comprising:

a polarizing beam splitter group configured to linearly polarize polarized light and split the polarized light into a reference beam and a measurement beam, wherein the reference beam and the measurement beam have a polarization angle difference of 90 degrees, and the measurement beam passes through the meta lens to undergo measurement, such that a phase analysis beam is formed;

an interfering polarizer group configured to cause the reference beam and the phase analysis beam to interfere with each other and circularly polarizing the reference beam and the phase analysis beam, such that a circularly polarized beam is formed; and a polarizing image pickup device configured to receive the circularly polarized beam to generate the unprocessed image, wherein the unprocessed image comprises a first interference image, a second interference image, a third interference image, and a fourth interference image, the first interference image, the second interference image, the third interference image, and the fourth interference image have first interference, second interference, third interference, and fourth interference respectively, and the first interference, the second interference, the third interference, and the fourth interference are different.

13. The optical phase measuring device according to claim 12, wherein a polarization angle of the first interference is less than a polarization angle of the second interference, the polarization angle of the second interference is less than a polarization angle of the third interference, and the polarization angle of the third interference is less than a polarization angle of the fourth interference.

14. The optical phase measuring device according to claim 13, wherein the first interference is 0 degree, the second interference is 45 degrees, the third interference is 90 degrees, and the fourth interference is 135 degrees.

15. The optical phase measuring device according to claim 12, wherein the interfering polarizer group comprises:

a polarizing beam splitter configured to cause the reference beam and the phase analysis beam to interfere with each other, such that an interference beam is formed; and a quarter-wave plate configured to circularly polarize the interference beam, such that the circularly polarized beam is formed.

16. The optical phase measuring device according to claim 12, wherein the polarizing beam splitter group comprises:

a half-wave plate configured to linearly polarize the polarized light, such that a linearly polarized beam is formed; and a beam splitter configured to split the linearly polarized beam, such that the reference beam and the measurement beam are formed.

17. An optical phase analyzing method, configured for phase measurement of a meta lens, comprising:

polarizing polarized light and splitting the polarized light into a reference beam and a measurement beam;

causing the measurement beam to pass through the meta lens to undergo measurement, and forming a phase analysis beam;

causing the reference beam and the phase analysis beam to interfere with each other, circularly polarizing the reference beam and the phase analysis beam, and forming a circularly polarized beam;

receiving the circularly polarized beam, and generating an unprocessed image; and obtaining the meta lens phase according to the unprocessed image; wherein the reference beam and the measurement beam have a polarization angle difference of 90 degrees; and the unprocessed image comprises a first interference image, a second interference image, a third interference image, and a fourth interference image, the first interference image, the second interference image, the third interference image, and the fourth interference image have first interference, second interference, third interference, and fourth interference respectively, and the first interference, the second interference, the third interference, and the fourth interference are different.

18. The optical phase analyzing method according to claim 17, wherein a polarization angle of the first interference is less than a polarization angle of the second interference, the polarization angle of the second interference is less than a polarization angle of the third interference, and the polarization angle of the third interference is less than a polarization angle of the fourth interference.

19. The optical phase analyzing method according to claim 18, wherein the polarization angle of the first interference is 0 degree, the polarization angle of the second interference is 45 degrees, the polarization angle of the third interference is 90 degrees, and the polarization angle of the fourth interference is 135 degrees.

20. The optical phase analyzing method according to claim 19, wherein the meta lens phase is obtained according to a phase computation formula, and the phase computation formula is as follows:

$$\Gamma = \tan^{-1} 2\left(\frac{I_1 - I_3}{I_2 - I_4}\right),$$

wherein $\Gamma$ is the meta lens phase;

$I_1$ is a first light field strength of the first interference image;

$I_2$ is a second light field strength of the second interference image;

$I_3$ is a third light field strength of the third interference image; and $I_4$ is a fourth light field intensity of the fourth interference image.

* * * * *